(12) United States Patent
Kumagai et al.

(10) Patent No.: US 9,105,297 B2
(45) Date of Patent: Aug. 11, 2015

(54) INFORMATION RECORDING DEVICE AND DATA RECOVERY METHOD

(71) Applicant: KABUSHIKI KAISHA TOSHIBA, Tokyo (JP)

(72) Inventors: Ryuta Kumagai, Kanagawa (JP); Shoichi Aoki, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 14/181,318

(22) Filed: Feb. 14, 2014

(65) Prior Publication Data

US 2015/0062739 A1 Mar. 5, 2015

(30) Foreign Application Priority Data

Aug. 30, 2013 (JP) .................................. 2013-180594

(51) Int. Cl.
*G11B 19/04* (2006.01)
*G11B 20/12* (2006.01)
*G11B 20/18* (2006.01)

(52) U.S. Cl.
CPC .......... *G11B 19/041* (2013.01); *G11B 20/1252* (2013.01); *G11B 20/18* (2013.01); *G11B 2020/1238* (2013.01)

(58) Field of Classification Search
None
See application file for complete search history.

(56) References Cited

U.S. PATENT DOCUMENTS

| 7,653,847 | B1 * | 1/2010 | Liikanen et al. | 360/31 |
| 7,685,360 | B1 * | 3/2010 | Brunnett et al. | 360/31 |
| 7,920,350 | B2 * | 4/2011 | Au et al. | 360/53 |
| 8,020,079 | B2 | 9/2011 | Kondo et al. | |
| 8,559,121 | B2 * | 10/2013 | Saito et al. | 360/13 |
| 8,625,215 | B1 * | 1/2014 | Burd et al. | 360/31 |
| 8,756,361 | B1 * | 6/2014 | Carlson et al. | 711/4 |
| 8,856,618 | B2 * | 10/2014 | Akiyama et al. | 714/763 |
| 8,929,019 | B2 * | 1/2015 | Tagami et al. | 360/31 |
| 2014/0055881 | A1 * | 2/2014 | Zaharris | 360/55 |

FOREIGN PATENT DOCUMENTS

| JP | 2002-042303 A | 2/2002 |
| JP | 2003-059051 A | 2/2003 |
| JP | 2010277645 A | 12/2010 |

* cited by examiner

*Primary Examiner* — Wayne Young
*Assistant Examiner* — James L Habermehl
(74) *Attorney, Agent, or Firm* — Patterson & Sheridan, LLP (57) ABSTRACT

An information recording device includes a recording medium with a plurality of data tracks and a controller that stores management information regarding data recorded in a group of adjacent data tracks, the recorded data including first data recorded in a first data track that is partially overwritten by second data subsequently recorded in a second data track that is adjacent to the first data track. The controller recovers management data of the recorded data based on whether or not a sector in the first data track that is adjacent to a sector in the second data track can be read by offset read processing when the sector in the second data track cannot be read by normal read processing.

20 Claims, 5 Drawing Sheets

INFORMATION RECORDING DEVICE AND DATA RECOVERY METHOD

CROSS-REFERENCE TO RELATED APPLICATION

This application is based upon and claims the benefit of priority from Japanese Patent Application No. 2013-180594, filed Aug. 30, 2013, the entire contents of which are incorporated herein by reference.

FIELD

Embodiments described herein relate generally to information recording devices and data recovery methods.

BACKGROUND

In an information recording device such as a hard disk drive (HDD), an increase in recording density and recording capacity is desirable. To achieve an increase in the recording density and the recording capacity, a recording method (also referred to as a shingled recording method) in which a part of data recorded on a track is overwritten when recording of data is performed for a next track. Incidentally, recorded data is sometimes lost as a result of data recording operation being interrupted during recording of data, for example, due to power shutdown of the information recording device. However, even when the recording operation is interrupted, the data recorded on the track may have been executed normally, and recovery of this data is performed. To recover such data, it is necessary to specify the location at which the recording operation has been interrupted, and a plurality of techniques of specifying the location at which the recording operation has been interrupted are proposed. The recovery of data is sometimes performed immediately after the information recording device recovers from a power shutdown, for example.

More particularly, in the shingled recording method, since part of a track on which recording has been performed is overwritten, the amount (length) of possible error data is larger and it takes more time to specify the location at which the recording operation has been interrupted. That is, in the information recording device to which the shingled recording method is applied, the location at which the recording operation has been interrupted is required to be specified more reliably and speedily during the recovery of lost data.

DETAILED DESCRIPTION

Embodiments provide an information recording device and a data recovery method that can recover data which have been recorded using the shingled recording method in a more reliable manner.

In general, according to one embodiment, an information recording device includes a recording medium with a plurality of data tracks, and a controller configured to store management information regarding data recorded in a group of adjacent data tracks, the recorded data including first data recorded in a first data track that is partially overwritten by second data subsequently recorded in a second data track that is adjacent to the first data track, wherein the controller is further configured to recover management data of the recorded data based on whether or not a sector in the first data track that is adjacent to a sector in the second data track can be read by offset read processing when the sector in the second data track cannot be read by normal read processing.

Hereinafter, embodiments will be described with reference to the drawings. It is to be understood that embodiments in addition to the following embodiments may be practiced after component elements thereof are modified without departing from the spirit of the following embodiments. Moreover, various embodiments may be implemented by appropriately combining the component elements disclosed in the following embodiments. For example, some of the component elements may be deleted. Furthermore, the component elements of different embodiments may be appropriately combined.

Figure 1:
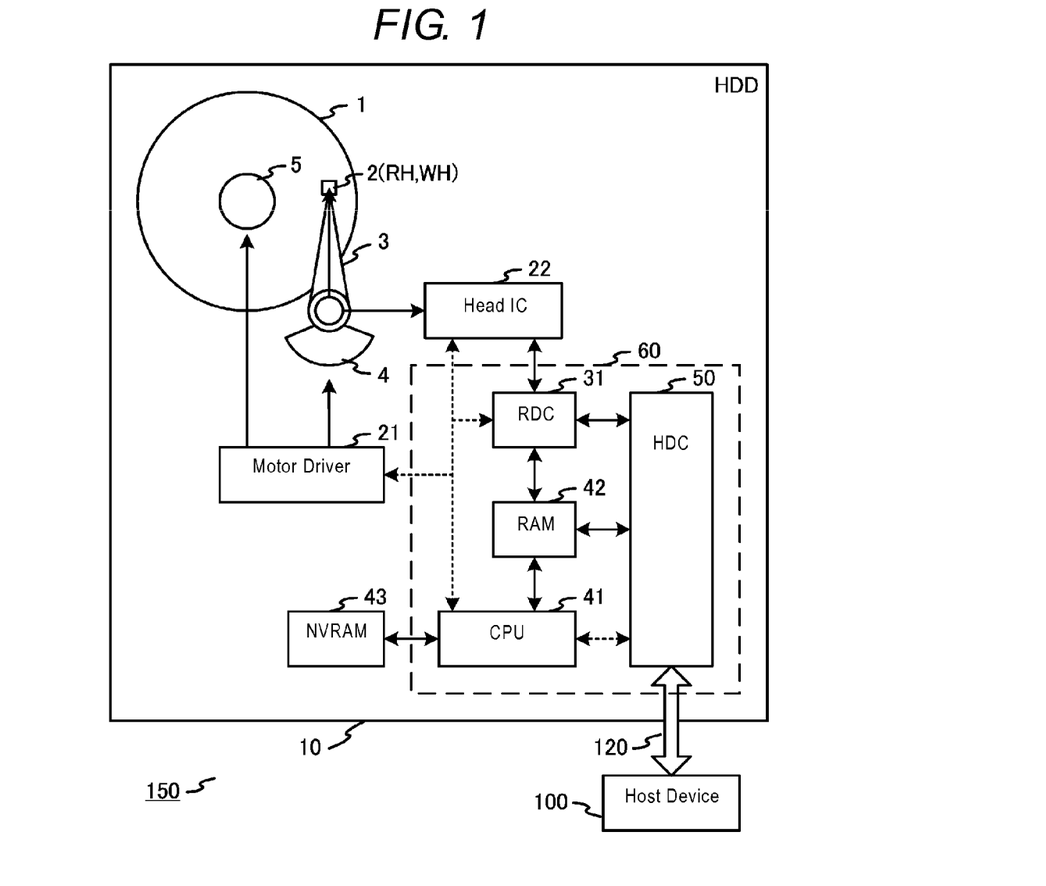
FIG. 1 is a block diagram showing the configuration of an electronic system provided with a magnetic disk unit which is an information recording device according to embodiments.

FIG. 1 is a block diagram showing the configuration of an electronic system 150 provided with a magnetic disk unit (hereinafter also referred to as a hard disk drive or HDD) 10 as an information recording device according to an embodiment. The electronic system 150 includes a host device 100 and the HDD 10. A host I/F 120 connects the host device 100 and the HDD 10 and is used for transmission and reception of commands and user data between the host device 100 and the HDD 10. The host I/F 120 conforms to the Serial Advanced Technology Attachment (SATA) standard or the Serial Attached SCSI (SAS) standard. The HDD 10 is connected to the host device 100 via the host I/F 120 and functions as an information recording device of the host device 100. For example, the electronic system 150 is a personal computer or a mobile device, and the host device 100 is a chip set IC provided in the personal computer or the like.

The HDD 10 has a head-disk assembly (HDA) including a magnetic disk 1, a slider 2, an arm 3, a voice coil motor (VCM) 4, and a spindle motor (SPM) 5. Moreover, the HDD 10 has a circuit block including a motor driver 21, a head IC 22, nonvolatile memory (NVRAM) 43, and a controller 60.

The controller 60 includes a read write channel IC (hereinafter also referred to as an RDC) 31, a CPU 41, RAM 42, and a hard disk controller (HDC) 50. DRAM (SDRAM) or SRAM, which is volatile memory that can perform faster data transfer than the magnetic disk 1, is used as the RAM 42. The NVRAM 43 is a nonvolatile recording section, and semiconductor memory such as flash memory or NAND memory and part of a recording area of the magnetic disk 1 are used as the NVRAM 43.

The HDD 10 according to the embodiment records data on the magnetic disk 1 (executes writing) and recovers data that has been recorded on the magnetic disk 1 but whose management information has not been updated, in such a way that the data can be read (executes recovering). For writing according to the embodiment, a recording method (hereinafter also referred to as a shingled recording method) in which part of data recorded on a track (except for the last track in a "track group" which is a recording unit of a shingled recording method) is overwritten when data recording is carried out on an adjacent track. Recovering is executed immediately when power is restored after the occurrence of power shutdown of the HDD 10, for example. These processes are controlled according to a program product (firmware) that is executed in the CPU 41. The data of the program product is stored in the NVRAM 43 or the magnetic disk 1.

The magnetic disk 1 is rotated by the SPM 5. The driving of the SPM 5 is controlled by a drive current from the motor driver 21. The arm 3 and the VCM 4 form an actuator. The actuator moves (as part of a seek operation) a head (not shown) installed on the slider 2 to a target position on the magnetic disk 1. That is, the actuator moves the slider 2 (more specifically, the head) mounted on the arm 3 in a radial direction on the disk 1 by the driving of the VCM 4. The driving of the VCM 4 is controlled by a drive current from the motor driver 21.

In the magnetic disk 1, a large number of cylinders (tracks) on which data is recorded are formed. Each cylinder includes a plurality of sectors. In each cylinder, a leading sector is defined. The magnetic disk 1 has a system area provided for recording management information regarding the operation of the HDD 10 and a control table regarding writing and recovering, and a data area provided for recording user data transmitted from the host device 100. The magnetic disk 1 is formed as a recording medium for recording data. Alternatively, the management information and the control table may be recorded on the NVRAM 43, not in the system area. The control table is stored in the RAM 42 during the operation of the HDD 10, and, before the power of the HDD 10 (more specifically, the RAM 42) is shut down, the control table is recorded (copied) in the NVRAM 43 which is a nonvolatile recording section or the system area of the magnetic disk 1 from the RAM 42.

The head, whose main body is the slider 2, has a read head RH and a write head WH that are installed on the slider. The read head RH reads the data recorded on the cylinder on the magnetic disk 1. The data to be read is servo information and user data. The write head WH writes the user data on the magnetic disk 1. The read head RH is formed as a reading unit, and the write head WH is formed as a recording unit. The width of the read head RH in a track direction is narrower than the width of the write head WH in a track direction.

The head IC 22 has a read amplifier and a write driver (neither of which is shown). The read amplifier amplifies a read signal read by the read head RH and transmits the amplified read signal to the RDC 31. The write driver transmits a write current in accordance with the write data output from the RDC 31 to the write head WH.

The controller 60 is formed as a one-chip integrated circuit including the RDC 31, the CPU 41, the RAM 42, and the HDC 50. The RDC 31 includes a read channel and a write channel (neither of which is shown). The read channel decodes the read signal read by the read head RH into data (including servo information) by processing the read signal. The write channel executes signal processing on the write data from the HDC 50. The RAM 42 may be provided outside the controller 60.

The HDC 50 controls data transfer between the host device 100 and the RDC 31 by controlling the RAM 42. The HDC 50 executes data transfer control by temporarily storing the read data and the write data in the RAM 42. Moreover, the HDC 50 performs storage and reading of a program product that is executed in the CPU 41 and a device parameter, for example, by controlling the NVRAM 43. The HDC 50 is formed as an interface unit that controls transmission and reception of command and data between the host device 100 and the HDD 10.

The CPU 41 is also referred to as a microprocessor or a microcontroller. The CPU 41 executes positioning control (servo control) of the head by controlling the VCM 4 via the motor driver 21. Moreover, the CPU 41 controls, via the RDC 31, writing and recovering processes that are performed on the magnetic disk 1. The CPU 41 controls these processes by using the HDA and the circuit block in accordance with the program product.

Figure 2:
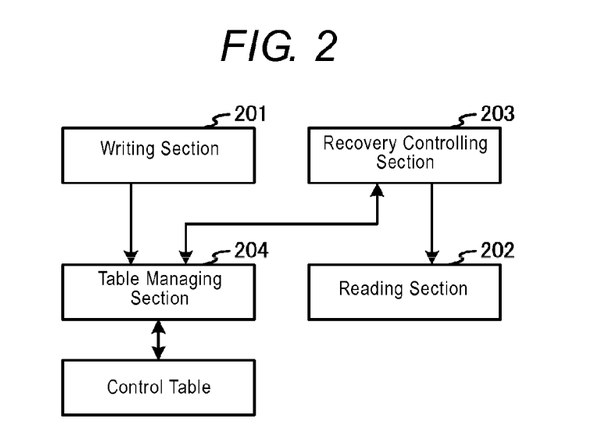
FIG. 2 is a configuration diagram for describing blocks that execute writing and recovering according to the embodiments.

Next, with reference to FIG. 2, blocks provided in the HDD 10 according to the embodiment for executing writing and recovering will be described. FIG. 2 is a diagram for describing the blocks that execute writing and recovering according to the embodiment.

The HDD 10 includes a writing section 201, a reading section 202, a recovery controlling section 203, and a table managing section 204. These blocks are realized by the HDA and the circuit block of the HDD 10 and the program product executed by the CPU 41. That is, writing and recovering according to the embodiment are executed by these blocks.

The writing section 201 executes writing by which data is recorded on the magnetic disk 1 by the write head WH. The writing section 201 executes writing in response to a command transmitted from the host device 100 or a request from inside the HDD 10. The data that is recorded on the magnetic disk 1 corresponds to the write data that is output from the RDC 31 to the head IC 22. The writing includes the positioning control of the read head RH and the write head WH by the VCM 4 and the rotation control of the SPM 5. In the embodiment, a shingled recording method is used. The writing section 201 requests the table managing section 204 to update the control table for each write operation.

The reading section 202 executes reading by which data is read from the magnetic disk 1 by the read head RH. The reading section 202 executes reading in response to a command transmitted from the host device 100 or a request from inside the HDD 10. In the embodiment, the reading section 202 executes reading based on a request from the recovery controlling section 203. The signal read from the magnetic disk 1 is output to the RDC 31 via the head IC 22. The reading includes the positioning control of the read head RH by the VCM 4 and the rotation control of the SPM 5. In other words, during reading, the positioning control of the read head RH is performed such that the read head RH is moved to a target position in a track of the magnetic disk 1 that is rotated by the SPM 5. In the reading of the embodiment, data is read from the system area and the data area of the magnetic disk 1.

The recovery controlling section 203 executes recovering by which data that has been recorded in the data area of the magnetic disk 1 but whose management information regarding the recording has not been updated, is recovered in such a way that the data can be read. During recovering, it is determined, although data could be recorded in the data area of the magnetic disk 1, whether or not the management information (the control table) regarding recording of the data has been updated. If the management information has not been updated, recovery of the management information is performed in such a way that reading of the recorded data becomes possible. A state in which the management information has not been updated may arise when, for example, power shutdown of the HDD 10 occurs during recording operation. Therefore, it is preferable that recovering is executed each time immediately after power is applied and the HDD 10 is started, for example. Moreover, the recovery controlling section 203 requests the table managing section 204 to read information of the control table every time the HDD 10 is started. Then, the recovery controlling section 203 executes operation of recovering by controlling the reading section 202 and the table managing section 204 in accordance with the read control table. By recovering according to the embodiment, the information of the control table is properly updated, and it becomes possible to read the data recorded in the data area.

The table managing section 204 manages the control table by controlling the RAM 42, the NVRAM 43, or the system area of the magnetic disk 1. The table managing section 204 executes reading and recording (updating) of the control table at the time of writing performed by the writing section 201 or recovering performed by the recovery controlling section 203. The table managing section 204 manages the control table in such a way that there is no redundant information.

The control table will be described now. In the control table, information indicating whether or not writing is being executed, position information on the position on the magnetic disk 1 in which recording has been executed, information indicating a logic address of the start of recording and the amount of recorded data (a block length or a sector length), and the like are associated with one another. As the position information indicating the position on the magnetic disk 1, cylinder/head/sector (CHS) information recorded in each servo area may be used. In the control table, various information regarding writing in one operation need to be associated with one another, and there is no need to manage the control table in a table form.

With the configuration described above, writing and recovering according to the embodiment are executed. That is, before the start of writing, the writing section 201 updates the control table based on the information indicating that writing is being executed with the position information on the position on the magnetic disk 1 and the information on a logic address of the start of recording, the amount of recorded data, and the like. After the completion of writing, the writing section 201 updates the target information in the control table based on the information indicating that writing is not being executed (i.e., writing has completed). Moreover, the recovery controlling section 203 checks the information of the control table every time the HDD 10 is started, for example. By checking the information in the control table, the information indicating whether or not writing is being executed, it is possible to determine whether or not the control table has been updated after writing.

That is, with the information recording device and a data recovery method according to the embodiment, by the above-described configuration, it is possible to recover data that may be lost in data recording to which the shingled recording method is applied.

First Embodiment

Figure 3:
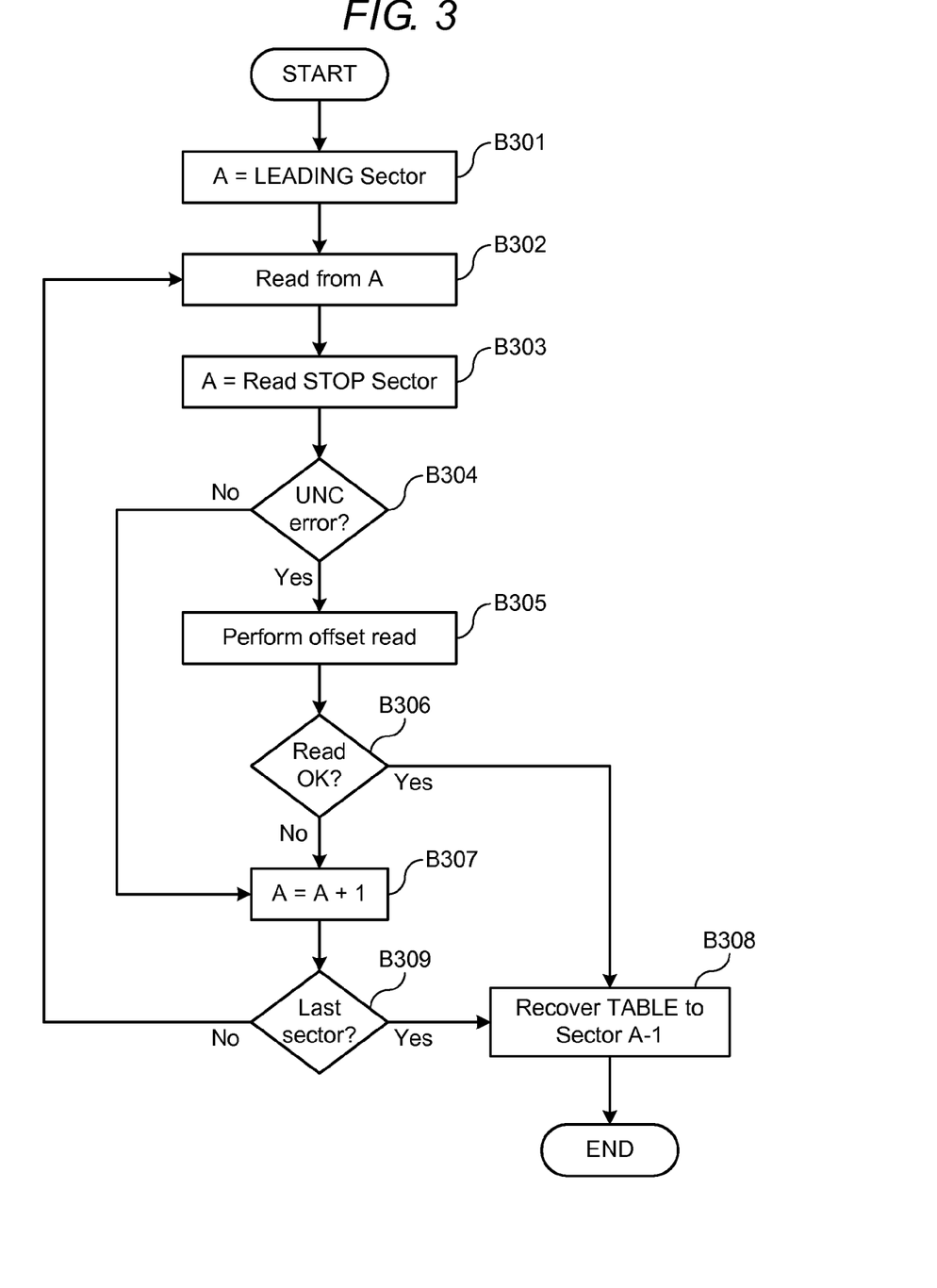
FIG. 3 is a flowchart for describing operation of recovering according to a first embodiment.

Next, with reference to FIG. 3, operation of recovering that is executed in the HDD according to the embodiment will be described. FIG. 3 is a flowchart for describing operation of recovering according to a first embodiment.

As described earlier, recovering according to the embodiment is started when the recovery controlling section 203 checks the control table via the table managing section 204 immediately after the HDD 10 is started. Based on the read control table, the recovery controlling section 203 specifies a location (a track, a sector, or a track group which is a recording unit of shingled recording) in which recovering is needed. Specifically, if information indicating that writing is being executed is present in the control table, the location corresponding to this information is specified as the location in which recovering is needed. When the location in which recovering is needed is specified, the flowchart shown in FIG. 3 is started.

The recovery controlling section 203 sets a variable A as a leading sector which is a start sector of recovering (B301), and sequential read from the variable A sector (the leading sector) by the reading section 202 is started (B302). When read operation is stopped because of some error or other factors, the recovery controlling section 203 sets the variable A as a read stop sector (B303). Then, it is determined whether or not the variable A sector (the read stop sector) is an uncorrectable (UNC) error sector (B304). If the variable A sector is a UNC error sector (Yes in B304), the recovery controlling section 203 starts offset read processing by the reading section 202 on an adjacent sector of the sector A (the read stop sector) in an adjacent track which would have been overwritten when the track on which reading has been performed was written (B305).

The offset read processing is carried out by reading the track that is adjacent to the track in which a read stop sector is present after offsetting the read head RH toward the track in which the read stop sector is present. It is preferable that the amount by which the read head RH is offset is set such that the read head RH is located in a position nearer to the track in which the read stop sector is present, within the range of a track width (a write track width) at the time of recording on the target track of the offset read. In other words, the read head RH is offset to be in a position which is within the range of a write track immediately after recording on the target track of the offset read but would have been overwritten when writing is performed on the track in which the read stop sector is present.

Next, it is determined whether or not the result of the offset read processing (B305) is read OK (B306). If the result is not read OK (No in B306), the variable A is incremented by 1 (B307). In addition, if the read stop sector is not a UNC error sector (No in B304), steps B305 and B306 are skipped and the variable A is incremented by 1 (B307). In step B308, the recovery controlling section 203 checks to see if the incremented variable A sector is the last sector of the last track in the track group (B309). If it is not (No in B309), the recovery controlling section 203 carries out the sequential read from the incremented variable A sector by the reading section 202 (B302). Then, the processing after B303 is continuously performed.

On the other hand, if the result of the offset read processing is read OK (Yes in B306) or the incremented variable A sector is the last sector of the last track in the track group (Yes in B309), the recovery controlling section 203 recovers the control table to a sector (A−1) (that is, one sector before the read stop sector) (B308). Moreover, the recovery controlling section 203 makes a request to the table managing section 204 to update the recovered control table. Then, recovering is ended.

Alternatively, in place of the procedure described above, after the variable A is incremented by 1 in B307 and it is determined that the incremented variable A sector is not the last sector of the last track in the track group (No in B309), before sequential read from the incremented variable A sector is executed again (B302), the variable A may be set as a leading sector (B301), and the control table may be recovered from the leading sector up to one sector before the read stop sector. Recovering the control table whose recovery is fixed eliminates the need to repeat the same processing when power shutdown occurs during recovering.

Furthermore, instead of ending recovering immediately after recovering the control table to one sector before the read stop sector (the variable A) (B308), the variable A may be incremented by 1 once more and a next sector after the read stop sector may be read. Then, if this sector is determined to be a UNC error sector (Yes in B304) and the result of the offset read processing (B305) of an adjacent sector of this sector in an adjacent track is read OK (Yes in B306), recovering may be ended. With this rechecking, it is possible to determine the first read stop sector more reliably.

Figure 4A:
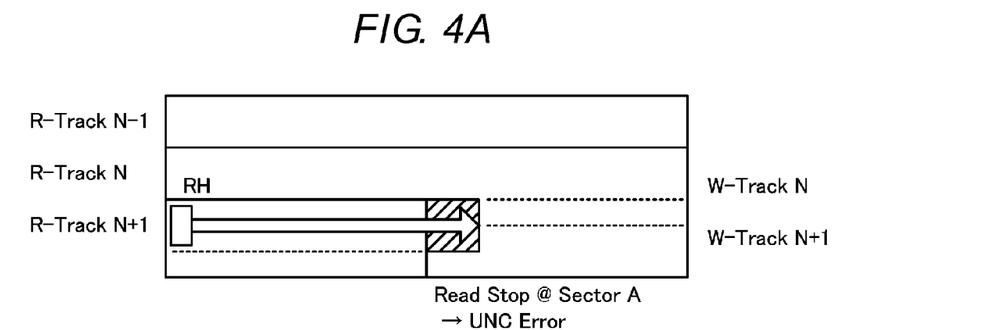
FIGS. 4A to 4C are diagrams conceptually showing the operation of recovering according to the first embodiment.
Figure 4B:
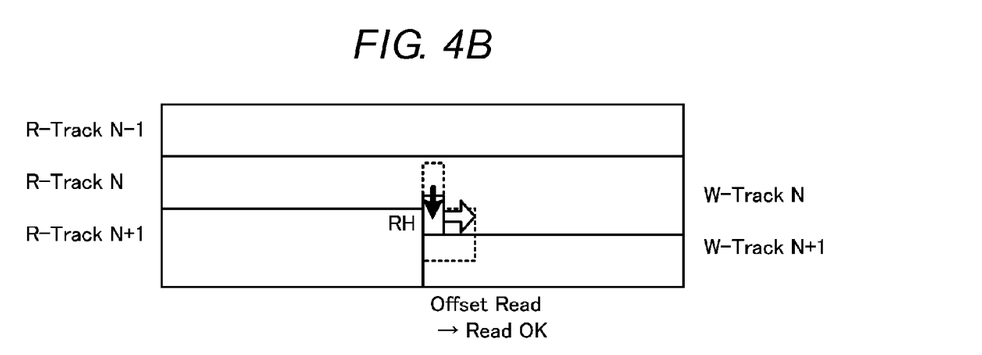
Figure 4C:
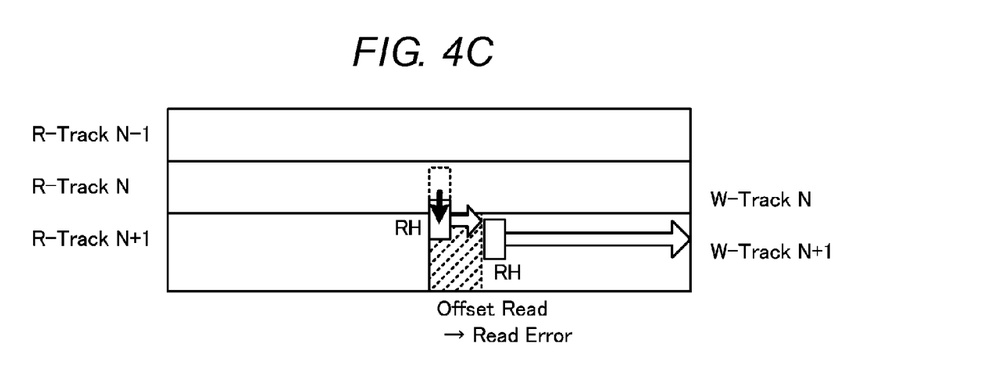

Next, by using FIGS. 4A to 4C, conceptual operation of recovering according to the first embodiment will be described. FIGS. 4A to 4C are diagrams conceptually showing the operation of recovering according to the first embodiment.

In FIGS. 4A to 4C, an R-Track means a read track and a W-Track means a write track. In this embodiment, the width of the read head RH in a track direction is narrower than the width of the write head WH in a track direction. In the shingled recording method, since part of data recorded on a track is overwritten when recording is performed on a next track, it is preferable that the width of the read track is narrower than the width of the write track. Here, it is assumed that a plurality of tracks including tracks from a leading sector of an R-Track (N−1) to an R-Track (N+1) are specified as a location in which recovering is needed.

FIG. 4A depicts a state in which sequential read is started from the leading sector of the R-Track (N−1) by the read head RH, the R-Track (N−1) and an R-Track (N) are read without a stop, and the R-Track (N+1) is being read. In reading the R-Track (N+1), it is assumed that reading stops in a sector marked with diagonal lines and this sector is determined to be a UNC error sector. Then, as shown in FIG. 4B or FIG. 4C, offset read processing in an adjacent sector of a sector A (a read stop sector) in the R-Track (N) which is an adjacent track of the R-Track (N+1) is started.

In the example of FIG. 4B, since the result of the offset read processing indicates read OK, the control table from the leading sector of the R-Track (N−1) to one sector before the sector A (the read stop sector, that is, the UNC error sector) of the R-Track (N+1) is recovered. That is, FIG. 4B shows a case where the result is Yes in B306 in the flowchart of FIG. 3. This case corresponds to an example in which there is a high possibility that writing is not performed on the sector A (the read stop sector) and the data in the adjacent track is not overwritten. In other words, this case corresponds to an example in which there is a possibility that, during writing performed on the W-Track (N+1), writing stopped in the sector A of this track.

On the other hand, in an example of FIG. 4C, since the result of the offset read processing indicates read NG, sequential read from a next sector of the UNC error sector of the R-Track (N+1) is started again. That is, FIG. 4C shows a case where the result is No in B306 in the flowchart of FIG. 3. This case corresponds to an example in which the sector A (the read stop sector) is a read NG sector, although writing has been performed thereon, and there is a high possibility that a next sector of the sector A can be read.

As described above, by recovering according to the first embodiment, it is possible to recover the data on which writing has been performed normally and whose control table has not been updated properly. In the related art, for example, when a UNC error occurred in target data of recovering, since a read retry is performed on the sector and the subsequent sector with varying parameters regarding reading, it sometimes took much time to perform recovering. According to the first embodiment, when a UNC error occurs in target sector of recovering, it can be easily determined in a shorter period of time whether the sector is a sector which is a read NG sector, although writing has been performed thereon, or a sector which is a read NG sector as a result of writing having been interrupted. Therefore, with the information recording device and the data recovery method according to the first embodiment, it is possible to recover data that may be lost in data recording to which the shingled recording method is applied in a more reliable manner.

Second Embodiment

Figure 5:
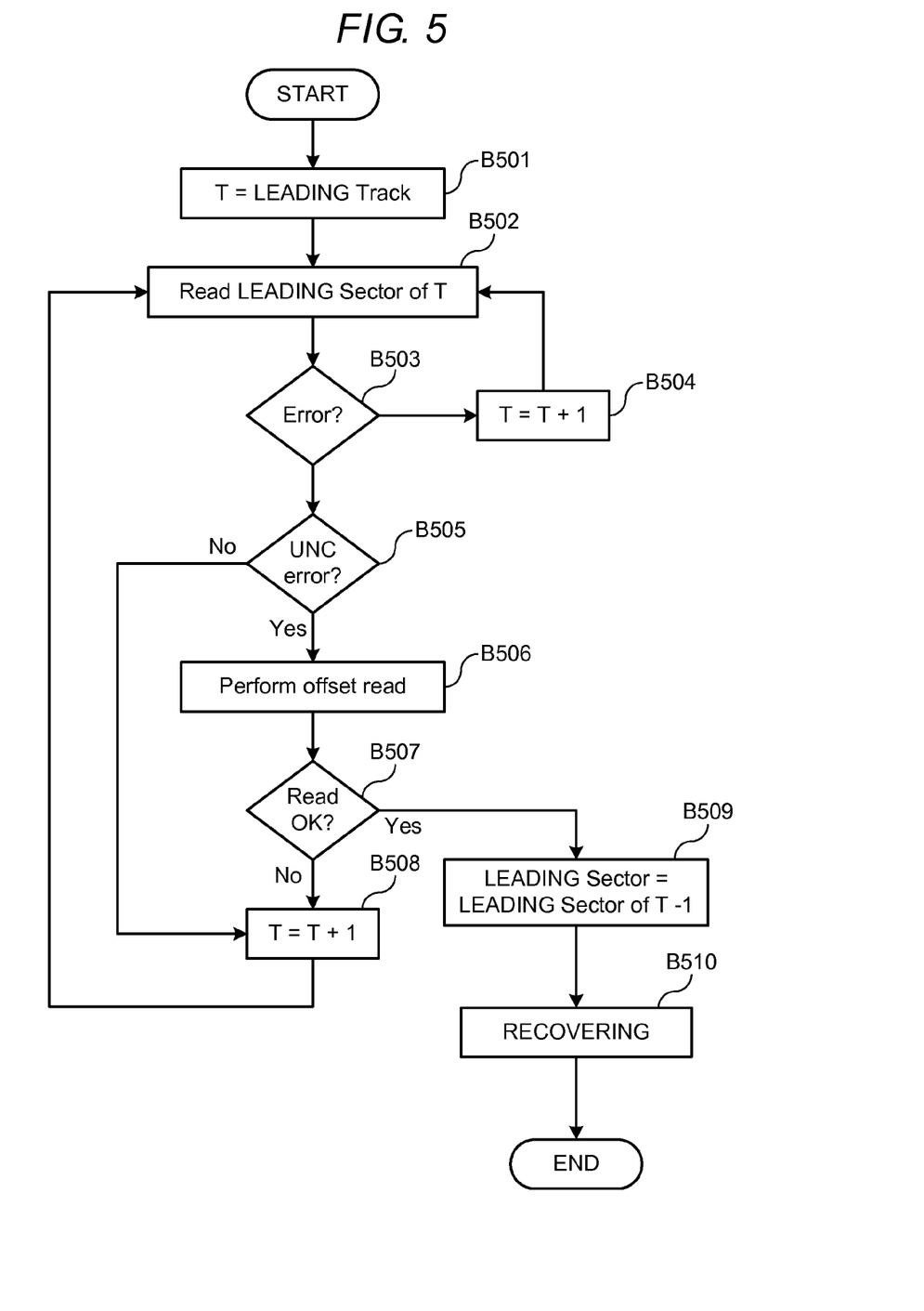
FIG. 5 is a flowchart for describing operation of recovering according to a second embodiment.

Next, by using FIG. 5, operation of another recovering that is executed in the HDD according to the embodiment will be described. FIG. 5 is a flowchart for describing operation of recovering according to a second embodiment.

Recovering according to the second embodiment makes it possible to perform recovering at higher speed by reading a leading sector of each track in a location in which recovering is to be performed.

Also during recovering according to the second embodiment, as described earlier, processing is started as a result of the recovery controlling section 203 reading the control table via the table managing section 204 immediately after the start of the HDD 10. Based on the read control table, the recovery controlling section 203 specifies a location (a track or a sector) in which recovering is needed. When the location in which recovering is needed is specified, the flowchart shown in FIG. 5 is started.

The recovery controlling section 203 sets a variable T as a leading track in the location in which recovering is needed (B501) and executes reading of a leading sector of the variable T track (the leading track) by the reading section 202 (B502). Then, it is determined whether or not an error occurred in the read sector (B503). If no error occurred (No in B503), the variable T is incremented by 1 (B504), and the recovery controlling section 203 executes again reading of the leading sector of the incremented variable T track by the reading section 202 (B502).

If an error occurred in the read sector (Yes in B503), it is determined whether or not the error is a UNC error (B505). If the error in the read sector is a UNC error (Yes in B505), the recovery controlling section 203 executes offset read processing on a leading sector of a variable (T−1) track by the reading section 202 (B506). Since the offset read processing that is executed here is the same as the offset read processing that is executed in the flowchart shown in FIG. 3, the detailed description thereof is omitted.

Next, it is determined whether or not the result of the offset read processing is read OK (B507). If the result is not read OK (No in B507), the variable T is incremented by 1 (B508), and the recovery controlling section 203 executes again reading of the leading sector of the incremented variable T track by the reading section 202 (B502). Then, the processing after B503 is continuously performed. That is, if the result of the offset read performed on an adjacent sector of a sector in which a UNC error occurred is not good (is NG), the track in which the sector in which a UNC error occurred is present is skipped and reading of a leading sector of the next track is executed again.

In addition, if the error in the read sector is not a UNC error (No in B505), steps B506 and B507 are skipped and the variable T is incremented by 1 (B508). After step B508, the recovery controlling section 203 executes again reading of the leading sector of the incremented variable T track by the reading section 202 (B502). On the other hand, if the result of the offset read processing is read OK (Yes in B507), the recovery controlling section 203 sets a leading sector of the variable (T−1) track as a leading sector in the location in which recovering is needed (B509) and executes recovering shown in FIG. 3 (according to the first embodiment) (B510). When recovering (according to the first embodiment) is completed, recovering according to the second embodiment is also ended.

Alternatively, in place of the procedure described above, after the variable T is incremented by 1 in B508, before reading of the leading sector of the incremented variable T track is executed again (B502), the variable T may be set as a leading track (B501). Moreover, if an error occurred in the read sector (Yes in B503) and the error in the read sector is a UNC error (Yes in B505), the recovery controlling section 203 may read the same sector (execute read retry) after varying a parameter regarding reading instead of proceeding to the next processing immediately. This read retry makes it possible to detect an error sector more adequately.

Moreover, a sector that is checked in each track does not have to be a leading sector, and reading of any one sector of each track may be executed. Furthermore, a determination as to whether or not an error occurred in the read sector (B503) and a determination as to whether or not the error occurred is a UNC error (B505) may be made at the same time. That is, it may be determined whether or not the read sector is a UNC error sector. This makes it possible to execute recovering more easily.

Figure 6A:
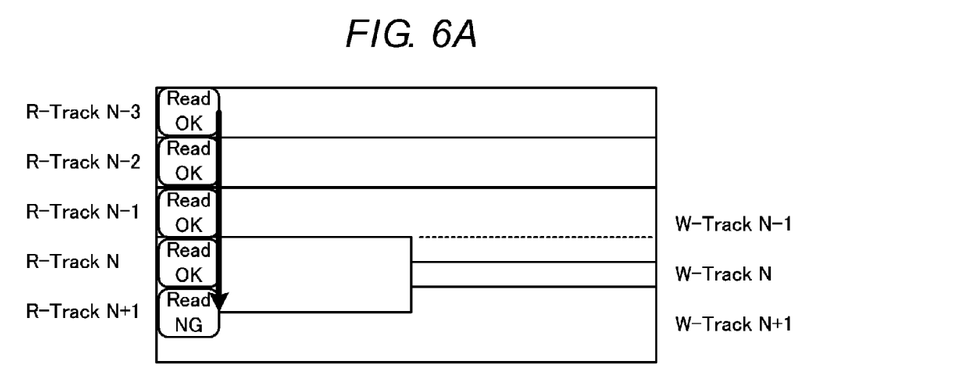
FIGS. 6A to 6C are diagrams conceptually showing the operation of recovering according to the second embodiment.
Figure 6B:
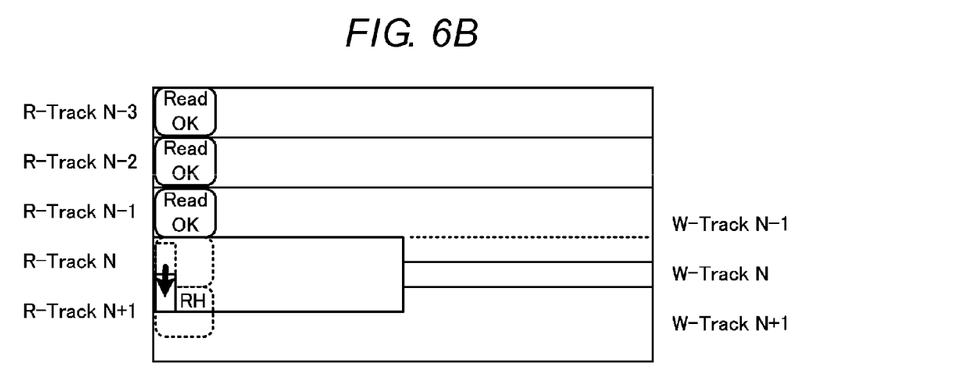
Figure 6C:
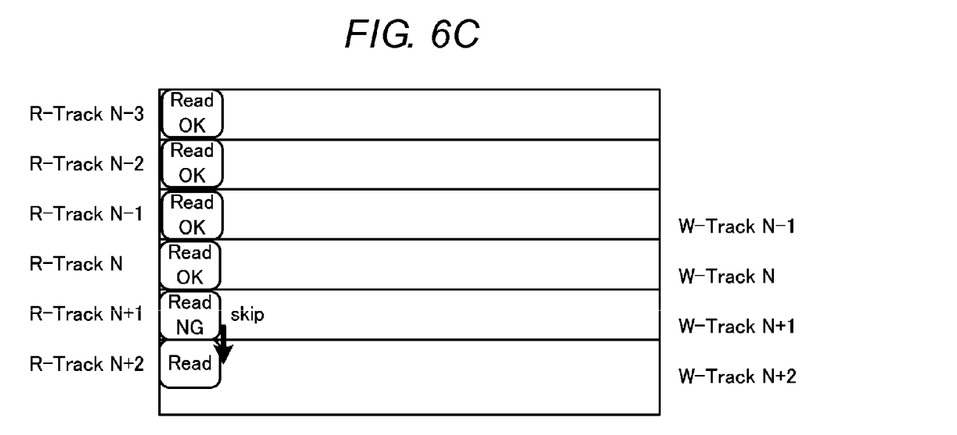

Next, by using FIGS. 6A to 6C, conceptual operation of recovering according to the second embodiment will be described. FIGS. 6A to 6C are diagrams conceptually showing the operation of recovering according to the second embodiment.

Also in FIGS. 6A to 6C, as in the case of FIGS. 4A to 4C, an R-Track means a read track and a W-Track means a write track. Also in the second embodiment, the width of the read head RH in a track direction is narrower than the width of the write head WH in a track direction. Here, it is assumed that a plurality of tracks including tracks from an R-Track (N−3) to an R-Track (N+1) are specified as a location in which recovering is needed.

As shown in FIG. 6A, reading of a leading sector of each track is executed by the read head RH sequentially from the R-Track (N−3), and it is determined whether or not the result is read OK. In this example, it is assumed that the result is read NG in reading of a leading sector of the R-Track (N+1) and this sector is determined to be a UNC error sector. Then, as shown in FIG. 6B, offset read processing in a leading sector of an R-Track (N) which is an adjacent track of the R-Track (N+1), one track before the R-Track (N+1), is started.

In the example of FIG. 6B, since the result of the offset read processing is read OK, the leading sector of the R-Track (N) is set as a leading sector in recovering according to the first embodiment. Then, recovering according to the first embodiment is executed from the set leading sector (the leading sector of the R-Track (N)). That is, FIG. 6B shows a case where the result is Yes in B507 in the flowchart of FIG. 5. This case corresponds to an example in which writing is not performed on a W-Track (N+1) corresponding to the R-Track (N+1) and there is a high possibility that the data of the R-Track (N) which is an adjacent track of the R-Track (N+1), one track before the R-Track (N+1), is not overwritten. In other words, this case corresponds to an example in which there is a possibility that, during writing performed on the W-Track (N), writing stopped on a sector of this track. Therefore, by executing recovering according to the first embodiment on this track, it is possible to specify the sector in which writing stopped.

On the other hand, in an example of FIG. 6C, since the result of the offset read processing is read NG, reading of a leading sector of an R-Track (N+2) which is the next track of the R-Track (N+1) is started again. That is, FIG. 6C shows a case where the result is No in B507 in the flowchart of FIG. 5. This case corresponds to an example in which the leading sector of the R-Track (N+1) is a read NG sector, although writing has been performed thereon, and there is a high possibility that the leading sector of the R-Track (N+2) which is the next track of the R-Track (N+1) can be read.

As described above, also by recovering according to the second embodiment, it is possible to recover the data on which writing has been performed normally but whose control table has not been updated properly. According to the second embodiment, when a UNC error occurs in target sector of recovering, it can be easily determined in an even shorter period of time whether the sector is a sector which is a read NG sector, although writing has been performed thereon, or a sector which is a read NG sector as a result of writing having been interrupted. Therefore, with the information recording device and the data recovery method according to the second embodiment, it is possible to recover data that may be lost in data recording to which the shingled recording method is applied in a more reliable manner.

According to the embodiments described above, recovering is executed by controlling the HDA and the circuit block of the HDD 10 in accordance with the program product that is executed in the CPU 41. That is, with the information recording device and the data recovery method according to the embodiments, it is possible to recover data that may be lost in data recording to which the shingled recording method is applied in a more reliable manner.

While the above-described embodiments deal with the HDD 10 as an example of the information recording device, the embodiments may be applied to a hybrid drive that uses a nonvolatile semiconductor memory (for example, NAND memory, MRAM, or FeRAM) as a cache of the magnetic disk 1.

Moreover, in addition to the examples of the embodiments described above, the following modified example may be adopted. It is preferable that recovering is executed immediately after power of the HDD 10 is applied and the HDD 10 is started, but recovering may be performed at other times. For example, recovering may be executed with so-called idle timing when processing to respond to a command from the host device 100 is not executed.

With the information recording device and the data recovery method to which the embodiments described above (and the modified example thereof) are applied, it is possible to execute recovering more easily at higher speed. When recovering is executed immediately after the start of the HDD 10, by speeding up the execution of this processing, the time that elapses until it become possible to receive a command from the host device 100 is reduced, and it can be expected that the startup performance of the HDD 10 is improved.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information recording device comprising:
   a recording medium with a plurality of data tracks; and a controller configured to store management information regarding data recorded in a group of adjacent data tracks, the recorded data including first data recorded in a first data track that is partially overwritten by second data subsequently recorded in a second data track that is adjacent to the first data track, wherein the controller is further configured to recover management data of the recorded data based on whether or not a sector in the first data track that is adjacent to a sector in the second data track can be read by offset read processing when the sector in the second data track cannot be read by normal read processing.

2. The information recording device according to claim 1, further comprising a write head and a read head, wherein a width of a data track produced by the write head during recording is greater than an average width of the data tracks in the group.

3. The information recording device according to claim 2, wherein the controller is configured to perform normal read processing by positioning the read head above a data track and offset read processing by positioning the read head between adjacent data tracks.

4. The information recording device according to claim 1, wherein the controller is configured to recover the management information of the recorded data if the sector in the first data track that is adjacent to the sector in the second data track can be read by offset read processing when the sector in the second data track cannot be read by normal read processing.

5. The information recording device according to claim 4, wherein the management information of the recorded data that is recovered indicates that the recorded data stopped at a sector that is one sector position before the sector in the second data track that cannot be read by normal read processing.

6. The information recording device according to claim 1, wherein the controller is configured to perform normal read processing on a sector in the second data track that is adjacent to the sector in the second data track that cannot be read by normal read processing.

7. The information recording device according to claim 1, wherein the management information of the recorded data indicates whether or not a write processing of the recorded data has completed or not.

8. An information recording device comprising:
a recording medium with a plurality of data tracks; and
a controller configured to store management information regarding data recorded in a group of adjacent data tracks, the recorded data including first data recorded in a first data track that is partially overwritten by second data subsequently recorded in a second data track that is adjacent to the first data track, wherein the controller is further configured to recover management data of the recorded data by:
performing normal read processing on a sector of successive data tracks in the group until an error is detected;
determining whether or not the sector having the error can be read by performing offset read processing on a preceding adjacent data track; and
performing sequential read processing on the preceding adjacent data track.

9. The information recording device according to claim 8, further comprising a write head and a read head, wherein a width of a data track produced by the write head during recording is greater than an average width of the data tracks in the group.

10. The information recording device according to claim 9, wherein the controller is configured to perform normal read processing by positioning the read head above a data track and offset read processing by positioning the read head between adjacent data tracks.

11. The information recording device according to claim 8, wherein the sequential read processing on a data track includes:
performing normal read processing on successive sectors of the data track until an error is detected; and
determining whether or not the sector having the error can be read by performing offset read processing on a preceding adjacent data track.

12. The information recording device according to claim 11, the controller is configured to recover the management information of the recorded data when the sector having the error can be read by performing offset read processing on the preceding adjacent data track.

13. The information recording device according to claim 12, wherein the management information of the recorded data that is recovered indicates that the recorded data stopped at a sector that is one sector position before the sector having the error.

14. The information recording device according to claim 11, wherein the controller is configured to perform normal read processing on a sector that is adjacent to the sector having the error.

15. The information recording device according to claim 8, wherein the management information of the recorded data indicates whether or not a write processing of the recorded data has completed or not.

16. A data recovery method in an information recording device that includes a recording medium with a plurality of data tracks and records management information regarding data recorded in a group of adjacent data tracks, the recorded data including first data recorded in a first data track that is partially overwritten by second data subsequently recorded in a second data track that is adjacent to the first data track, the method comprising:
reading data from sectors of data tracks in the group,
when an error is detected during the reading of a sector in the second data track, performing offset reading of data in a sector in the first data track, and
recovering the management information regarding the recorded data based on whether or not the sector in the first data track can be read by the offset reading when the sector in the second data track cannot be read by normal read processing.

17. The method according to claim 16, wherein the information recording device further includes a write head and a read head, and a width of a data track produced by the write head during recording is greater than an average width of the data tracks in the group.

18. The method according to claim 17, wherein the normal read processing is performed by positioning the read head above a data track and the offset read processing is performed by positioning the read head between adjacent data tracks.

19. The method according to claim 16, wherein the controller is configured to recover the management information of the recorded data if the sector in the first data track that is adjacent to the sector in the second data track can be read by offset read processing when the sector in the second data track cannot be read by normal read processing.

20. The method according to claim 19, wherein the management information of the recorded data that is recovered indicates that the recorded data stopped at a sector that is one sector position before the sector in the second data track that cannot be read by normal read processing.

* * * * *